United States Patent [19]

Bleiberg et al.

[11] 4,040,876
[45] Aug. 9, 1977

[54] HIGH TEMPERATURE ALLOYS AND MEMBERS THEREOF

[75] Inventors: Melvin L. Bleiberg, Pittsburgh; Sidney Diamond, Monroeville; Arthur F. Rowcliffe, Greensburg; John A. Spitznagel, Export, all of Pa.

[73] Assignee: Westinghouse Electric Corporation, Pittsburgh, Pa.

[21] Appl. No.: 485,465

[22] Filed: July 2, 1974

[51] Int. Cl.$^2$ .......................... C22C 38/44; C21D 7/02
[52] U.S. Cl. ........................................ 148/37; 75/122; 75/128 W; 148/12 E; 148/31; 176/88
[58] Field of Search .................. 75/122, 124, 128 W, 75/134 F, 128 F; 148/31, 37, 38; 176/88

[56] References Cited

U.S. PATENT DOCUMENTS

| 2,403,128 | 7/1946 | Scott et al. | 75/171 H |
|---|---|---|---|
| 2,879,194 | 3/1959 | Eichelberger | 75/128 |
| 3,065,067 | 11/1962 | Aggen | 75/124 |
| 3,199,978 | 8/1965 | Brown et al. | 75/128 |
| 3,582,318 | 6/1971 | Szumachowski | 75/122 |
| 3,592,632 | 7/1971 | Gibson et al. | 75/124 |
| 3,837,846 | 9/1974 | Becker et al. | 75/124 |

*Primary Examiner*—C. Lovell
*Attorney, Agent, or Firm*—R. T. Randig

[57] ABSTRACT

An alloy consisting essentially of from about 14% to 19% chromium, from 25 to 35% of nickel, from about 2% to 3% molybdenum, from about 0.1% to 1% of silicon, up to 0.5% of manganese, from about 0.03 to 0.05% carbon, up to about 0.01% sulfur, up to about 0.01% of phosphorus, up to 0.01% boron, up to about 0.01% oxygen, up to about 0.02% nitrogen, small amounts of incidental impurities, and the balance being iron, the alloy having an $\overline{N}_v$ (average electron vacancy number) value of between 1.6 and 2.8, has an unexpected combination of properties enabling it to be formed by hot and cold working and heat treatment into components and members particularly suitable for use in nuclear reactors wherein the components are subjected to molten sodium, where the corrosion of the surface of the alloy is not in excess of the order of 1 to 2 mils per year, and the alloy exhibits low swelling when exposed to intense radiation, while exhibiting good physical properties at temperatures of up to 1325° F. Worked and heat treated alloy members are usable as fuel cladding, grid supports, ducts and other sodium contacting in-core components that may be spaced in close predetermined relationship to ensure high reactor performance, particularly in breeder reactors, for the desired useful life thereof.

2 Claims, 4 Drawing Figures

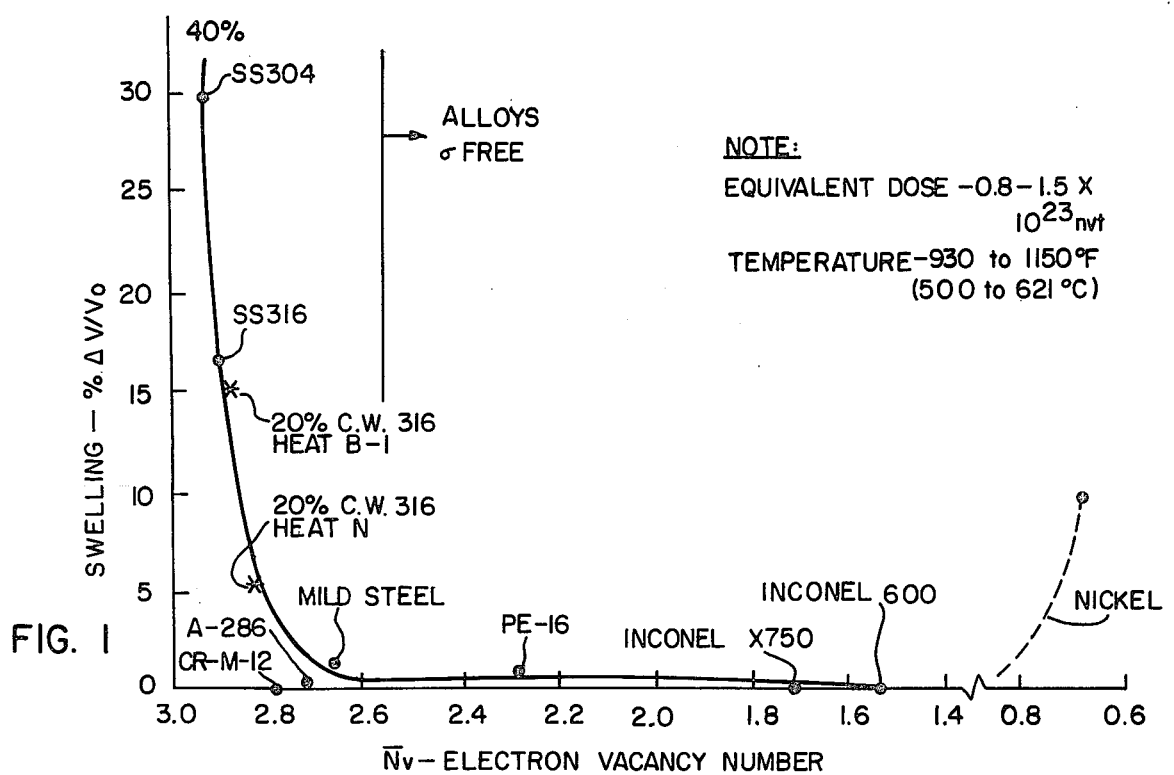
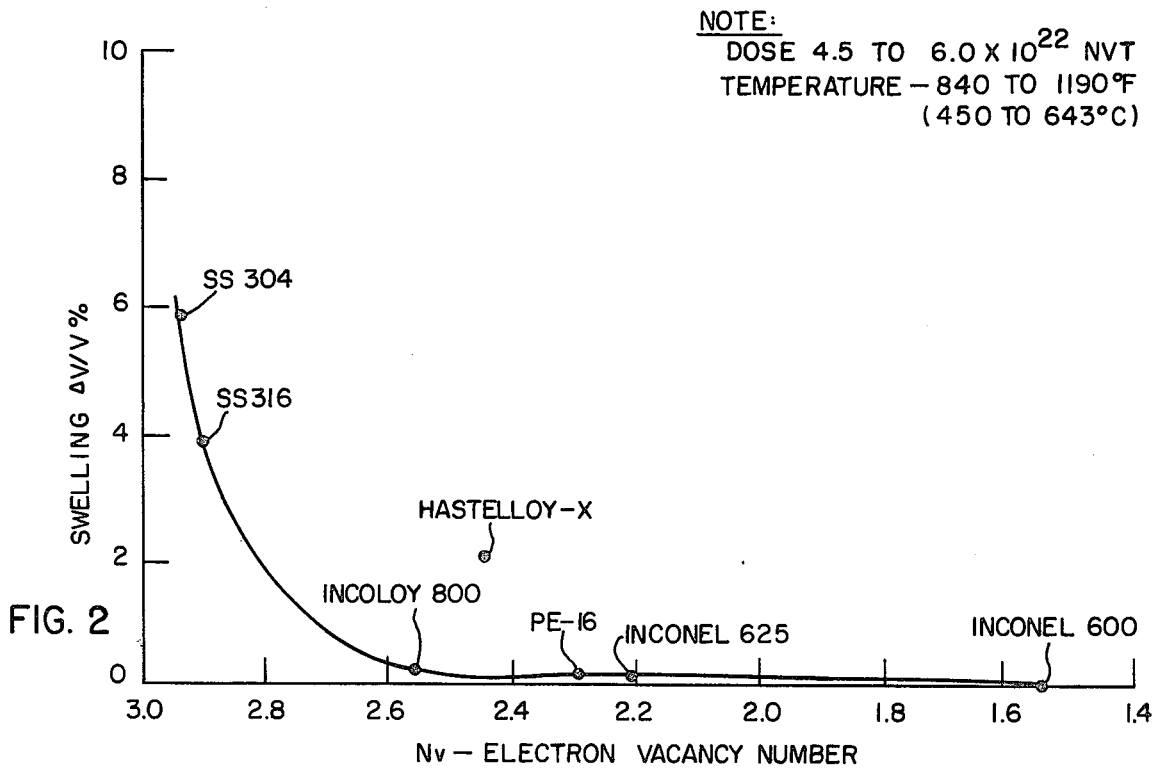

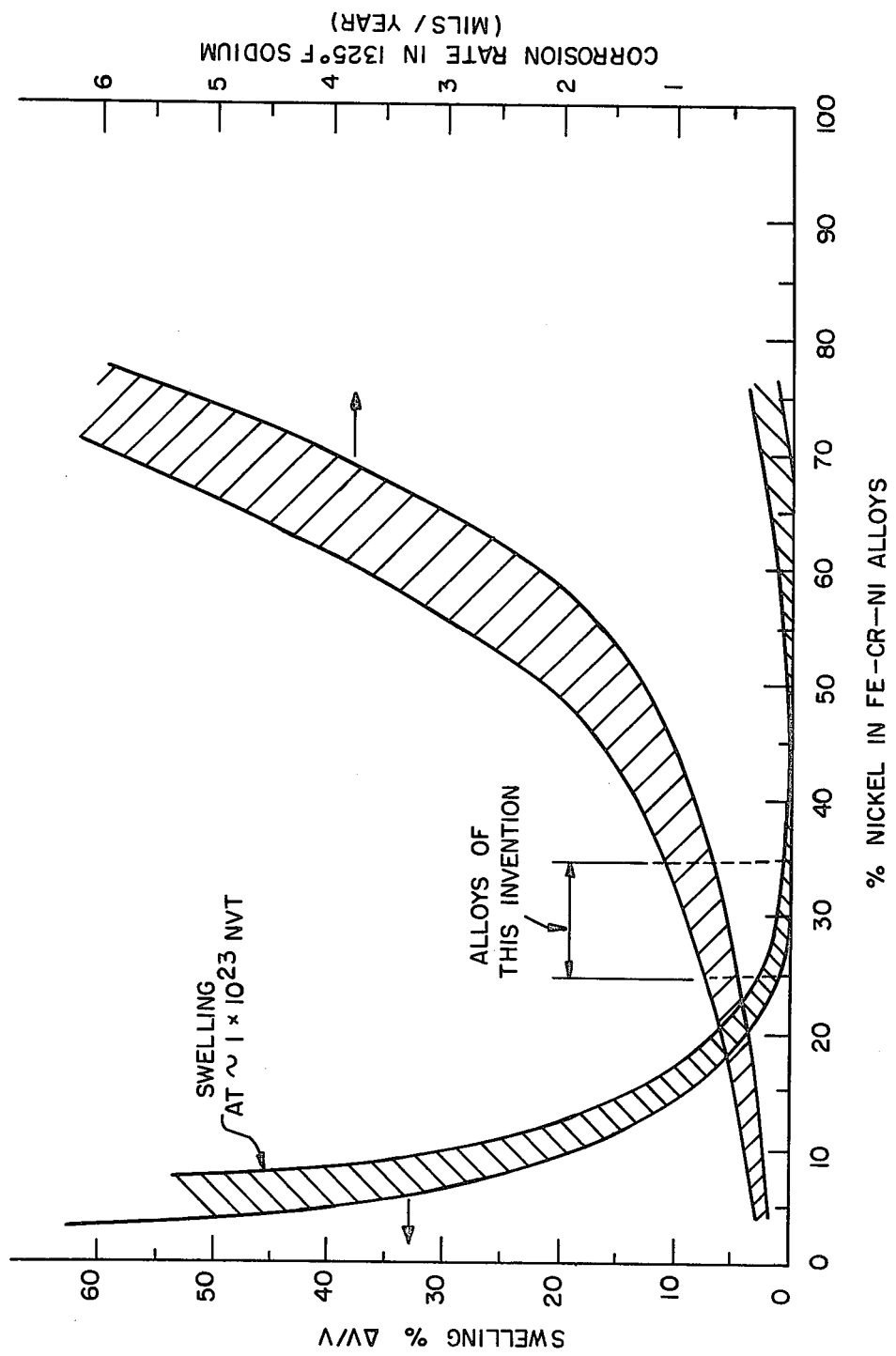

HIGH TEMPERATURE ALLOYS AND MEMBERS THEREOF

BACKGROUND OF THE INVENTION

1. Field of the Invention

This invention relates to the production of nickel-chromium-iron base alloys and members thereof produced by working and suitable heat treatment to provide solution hardening, that are particularly useful at elevated temperatures of up to 1325° F. Such alloys and members thereof have particular utility in nuclear reactors employing sodium in that these members have a very low corrosion rate and also have a low swelling when exposed to intense radiation for the desired life of such members under such radiation and sodium contacting conditions.

2. Description of the Prior Art

Nickel-chromium-iron base alloys are broadly well known in the art and a description of many of these alloys is set forth in "Metals Handbook", Volume 2, 8th Edition published in 1964 by the American Society for Metals, particular references being had to the chapter entitled "Heat Treating of Stainless Steel and Heat Resisting Alloys" beginning on page 243 and ending on page 267. The section headed "Heat Treating of Stainless Steel" which extends from page 243 to page 254, lists the properties and characteristics of austenitic stainless steels including the heat treatment, resistance to oxygen corrosion, the discussion of the Sigma phase and its possible impact on the alloy characteristics, as well as the mechanical properties of the various alloys obtained by particular heat treatments. An extended description of a wide class of heat resisting alloys is contained in the section entitled "Heat Treating of Heat-Resisting Alloys" extending from page 257 to page 267 of this "Metals Handbook" citation.

The alloy composition of the prior art that approaches most closely the compositions of the present invention is alloy designated HT, set forth on page 258 of the Metals Handbook, which HT alloy comprises 15% chromium, 35% nickel, 0.55% carbon and the balance being iron. This alloy is described as a casting alloy and obviously is not intended to be cold or hot worked or otherwise shaped into a member but is simply employed as a casting which, at most, is finished by grinding or machining of the casting to a desired surface finish or shape without modifying the grain fiber, texture or shaped by substantially deformation as is effected by appreciable hot and/or cold working.

U.S. Pat. No. 2,857,266 refers to the HT alloy and is directed to an improvement thereof which patent alloy comprises between 23 to 27% chromium, between 34 and 37% nickel, between 1 to 2% molybdenum, between 1 and 2½% silicon, between 1 and 4% manganese, between 0.05% and 0.40% aluminum, nitrogen between 0.15% and 0.40%, carbon between 0.45 and 0.55%, boron between 0.001% and 0.04%, with impurities not exceeding 0.4% of phosphorus and 0.04% of sulfur, and the balance being iron. This patent discloses the various physical properties of the alloys particularly at temperatures of 1800° F and higher. Nothing is said in this patent about shaping or working of the alloy and it is quite evident that the alloy is cast into shape without any hot or cold working.

U.S. Pat. No. 3,796,567 is directed to nickel-chromium-iron base alloys incorporating small amounts of various additional components such as silicon, molybdenum, titanium and manganese, in which the chromium may vary from 16 to 25% and the nickel from 8 to 25% by weight. The patent is specifically directed to the deoxidation of these alloys by adding metallic calcium in order to permit welding without globule formation.

U.S. Pat. No. 3,235,378, discloses in column 5, nominal compositions of a variety of nickel-chromium base stainless steels, as well as certain high nickel base alloys containing substantial amounts of chromium. This patent comprises such stainless steels on the basis of their oxidative and sulfide corrosion at high temperatures under conditions which are prevalent in gas turbines for example.

At the present time, liquid metal fast breeder reactors (LMFBR) are an important development in the energy field. These reactors employ liquid sodium as the medium for absorbing energy from nuclear fuel elements. In service, the liquid sodium is at temperatures of from about 1000° F to 1200° F, with occasional hot spots reaching 1325° F. While the liquid sodium employed in these reactors is free from oxygen or water to the lowest possible reasonable extent in order to avoid the formation of sodium oxides which are extremely corrosive to many metals, molten sodium itself is a corrosive material and many of the metallic elements dissolve therein to some extent. Thus iron, nickel and chromium, are soluble to some modest degree in hot sodium. Since the molten sodium flows from the highest temperature areas in the vicinity of the fuel elements to a heat exchanger where its temperature drops substantially, any dissolved metallic elements that have a higher solubility in sodium at the elevated temperatures will reach a low temperature point where, because of lower solubility, a portion of the dissolved elements may precipitate out upon the surfaces of the heat exchanger and, consequently, a transfer thereto will take place of metallic elements from the nuclear fuel portions of the reactor. Undesirable results occur in that metal is removed from the fuel elements and in-core components and precipitated on heat exchanger surfaces. Reference should be had to "Symposium on Chemical Aspects of Corrosion and Mass Transfer AIMG - 1971", and particularly the paper entitled "Sodium Corrosion Behavior of Alloys For Fast Reactor Applications" by G. A. Whitlow et al, wherein is listed the corrosion characteristics of some of the metals which would be present in alloy members being considered for the Liquid Metal Fast Breeder Reactor (LMFBR) at the present time.

The well known 316 stainless steel has been proposed for use in the LMFBR system for components such as fuel cladding, ducts, grid supports and structural components. At high irradiation of the order of $10^{23}$ nvt., it has been found tht 316 stainless steel and similar alloys will swell very substantially. Due to such swelling, components comprising such as 316 stainless steel will bow, bend or distort substantially, usually in erratic and unpredictable directions. Consequently, unless ample spacing provision is made, channels for flow of liquid sodium and around the fuel elements in particular, may be greatly restricted with the result that heat produced by the fuel elements is not properly or uniformly absorbed by the flowing sodium. Hot spots will occur under these conditions with groos overheating possible so that failure of such mechanical components and nuclear fuel grids and supports may result. In order to provide an adequate space for flow of molten sodium between or through ducts, fuel elements, grid supports and the like, excessively generous clearance must be present to accommodate reasonably expected swelling with its resulting bowing and distortion so that adequate flow spaces are present at all times within the expected life time of such reactor components.

One of the prime characteristics of a breeder reactor is the operating time required for such reactor to double the amount of fissile nuclear material produced therein as compared to the original quantity of fissile nuclear material present therein. The desired reasonably optimistic doubling time for present day breeder reactor design, assuming the availability of optimum materials, is about 10 years.

The doubling time of a breeder reactor is critically dependent on the spacing of the fuel rods with respect to each other and to a blanket of fertile nuclear material. If the expected swelling is, for example, 25%, the required spacing between fuel elements and so forth to accommodate bowing and distortion is so great that the doubling time of the breeder reactor would be of the order of 30 to 40 years or more. If the expected swelling of the alloy is of the order of 5%, the spacing of the fuel elements and other components is correspondingly reduced and the doubling life may be of the order of 15 to 10 years. Obviously it is of the highest importance to be able to space the fuel elements as closely together as safety and technoligical considerations permit to secure the shortest doubling time. The efficiency of the reactor and the doubling time are improved very significantly by the closest possible spacing of the fuel rods and other components of the reactor, taking into account all the distortion that may reasonably be expected to occur in service for the expected years of operation of each component.

A second critical factor to be taken into consideration in designing the components for an LMFBR is the rate of corrosion of the metal surface by the hot sodium flowing therepast. High nickel alloys in particular react with the molten sodium at a substantial rate, the corrosion being greater as the high nickel content increases; for example, nickel base alloys of 70% nickel content will corrode at the rate of 5 mils per year or greater on all surfaces exposed to the molten sodium at temperatures of 1325° F. Since it is desirable that a fuel element for instance, has a life of the order of 3 years in a LMFBR, the thickness of cladding of the fuel elements for example, must be originally sufficiently heavy to compensate for the fact that 15 mils or more of the thickness thereof on all surfaces exposed to the sodium will have been eroded away in 3 years service, yet leaving a sufficient metal wall thickness to withstand all of the pressures and stresses to be reasonably expected throughout this period of time. On the other hand, any excess thickness of cladding, for instance, not only increases the cost of the fuel element, but also increases the spacing between fuel elements and other support members and further introduces increased neutron capture losses.

It is therefore quite apparent that it is desirable to have an alloy that exhibits both low swelling under the intense radiation conditions to be expected over the reasonable life of a member of the alloy in the LMFBR and also low corrosion when in contact with sodium over such a prolonged period.

SUMMARY OF THE INVENTION

In accordance with the present invention, it has been discovered that an iron-nickel-chromium base alloy having a limited critical composition has a greatly reduced swelling tendency under intense neutron radiation along with extremely good resistance to corrosion by molten sodium of temperatures up to 1325° F, along with good creep rupture properties and high yield strengths at these temperatures. Briefly, these alloys comprise the following components, so proportioned as to have $\overline{N}_v$ values of between 1.6 and 2.8.

| Element | Broad Range | Preferred |
|---|---|---|
| Chromium | About 14 to 19% | 15 to 18% |
| Nickel | 25 to 35% | 25 to 30% |
| Molybdenum | 2 to 3% | 2 to 3% |
| Silicon | About 0.1 to 1% | .25 to 0.5% |
| Manganese | Up to 0.5% | 0.25 to 0.5% |
| Carbon | 0.03 to 0.05% | 0.04% |
| Sulfur | Up to 0.01% | Less than 0.005% |
| Phosphorus | Up to 0.01% | Less than 0.005% |
| Boron | Up to 0.01% | Up to 0.003% |
| Oxygen | Up to 0.01% | Up to 0.01% |
| Nitrogen | Up to 0.02% | Less than 0.002% |
| Iron | Balance | Balance |

Small amounts of incidental impurities may be present.

Examples of typical alloy compositions of this invention that would meet these criteria are:

| Element | Alloy #1 | Alloys #2 | Alloy #3 |
|---|---|---|---|
| Cr | 15 | 17 | 18 |
| Ni | 25 | 30 | 35 |
| Mo | 2.5 | 2.5 | 3.0 |
| Si | 0.5 | 0.5 | 0.5 |
| Mn | 0.5 | 0.5 | 0.5 |
| C | .04 | .04 | .04 |
| S | .002 | .002 | .002 |
| P | .002 | .002 | .002 |
| B | 0.003 | 0.003 | 0.003 |
| $O_2$ | .01 | 0.01 | .01 |
| $N_2$ | .002 | .002 | .002 |
| Fe | Balance | Balance | Balance |
| $\overline{N}_v$ | 2.60 | 2.54 | 2.47 |

An additional alloy composition variation is obtained with the boron level raised to 0.01%. Alloys with more than 0.003% boron, up to 0.01%, in the composition will provide for enhanced ductility at elevated temperatures of 1325° F.

The propensity of the iron-nickel-chromium base alloysof the present invention to swell under intense neutron radiation has been discovered to be related to the calculated electron vacancy number for the matrices of the alloy. It has been discovered that the empirical correlation derived by Boesch and Slaney in "Metal Progress" volume 86, Number 1, July 1964 in an article appearing on pages 109 to 111, applies to these alloys. Briefly, this correlation enables one to predict the formation of the sigma phase in the alloy by calculating the average electron vacancies of the metal matrix using the following equation:

$$\overline{N}_v = \sum_{i=1}^{n} M_i (N_v)_i$$

where $\overline{N}_v$ = average electron vacancy number, M = atomic fraction of each element and $N_v$ = individual electron vacancy number of each element.

We have discovered that the values determined by this equation also enables the relationship between $\bar{N}_v$ and swelling under intense radiation to be determined. Based on these correlations, the alloys of the present invention should have an $\bar{N}_v$ between 1.6 and 2.8 for minimal swelling, while taking other factors such as low corrosion or solubility in sodium into account. For some presently unexplainable reason, for all the commercially usable nickel-chromium-iron alloys of this invention proportioned within this $\bar{N}_v$ range, the total swelling is remarkably reduced. In a figurative sense within this $\bar{N}_v$ range of 1.6 to 2.8 a window has been discovered in the broad class of known iron-nickel-chromium base alloys comprising a relatively narrow but critical range of alloy compositions characterized by an unexpected exceptionally low swelling for a given degree of irradiation. In general, the alloys of the present invention with this $\bar{N}_v$ value have less than 5% swelling when exposed to radiation corresponding to as much as $3 \times 10^{23}$ nvt. Total radiation of this magnitude corresponds to that encountered within an LMFBR in a three year period of continuous operation while at a temperature of 530° C (about 1000° F).

BRIEF DESCRIPTION OF THE DRAWINGS

FIG. 1 is a chart plotting swelling of various alloys as induced at a predetermined degree of ion irradiation plotted against the $\bar{N}_v$ number for the alloys.

FIG. 2 is a chart showing swelling produced by neutron irradiation plotted against $\bar{N}_v$ for certain alloys for which data are available.

FIG. 4 is a graph plotting both swelling and corrosion in sodium for nickel-chromium-iron base alloys with variations in nickel content.

DETAILED DESCRIPTION OF THE PREFERRED EMBODIMENT

Figure 3:
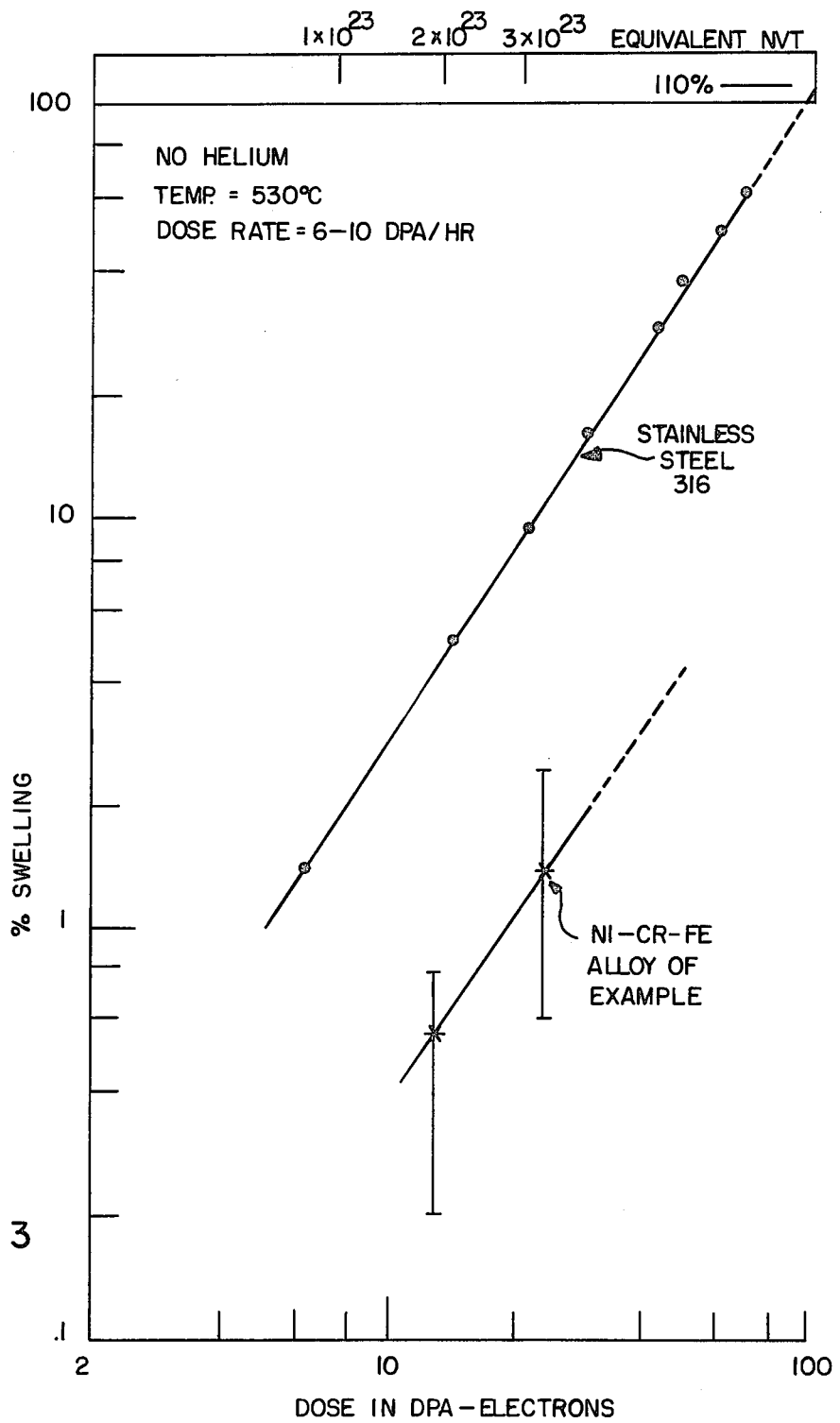
FIG. 3 is a graph plotting percent swelling against equivalent nvt radiation, with curves both for SAE316 stainless steel and for an alloy produced in accordance with the present invention.

Alloys in accordance with the present invention may be prepared by melting, preferably in a vacuum melting furnace either in an induction or consumable arc furnace, the following nickel-chromium-iron base alloy compositions: 14 to 19% chromium, at least 25% but not exceeding 35% nickel, from about 2% to 3% molybdenum as a solid solution hardener, from 0.1 to 1% silicon, up to 0.5% manganese and preferably 0.25% manganese, from about 0.03% to 0.05% carbon, up to about 0.01% sulfur, up to about 0.01% phosphorus, up to about 0.01% boron, up to 0.01% oxygen, not exceeding 0.02% nitrogen and preferably not exceeding about 0.002%, some small or trace amounts of other incidental impurities, and the balance being iron. The small amounts of the other impurities may comprise such elements as aluminum and calcium. It is important that the nitrogen be kept at an extremely low level to minimize helium production by nuclear transmutation. Vacuum degasification may be applied to the melt prior to casting it in order to reduce the nitrogen and other gas contents. After the molten alloy is cast into an ingot, it is hot worked into slabs and thence into bars, heavy rods or plates to approximately the thickness of the final desired shape. After cleaning the surface, the hot rolled shape can be given the equivalent of approximately 20% to 30% cold working to effect a reduction to essentially the desired shape and final surface finish. Of course, grinding, machining and polishing may be applied to produce properly dimensioned tubes, supports, grids and ducts from the cold worked shapes. The member may then be heat treated to obtain the desired mechanical properties and grain size. It is necessary that the formation of undesirable sigma phase be avoided by proper selection of the constituents; normally this will entail keeping the chromium below about 19% and preferably with a maximum of about 18%. Sigma phase structure development is undesirable because its presence results in decreased ductility of the alloy and may detrimentally affect its corrosion resistance.

EXAMPLE

The following alloy melt composition was produced: iron 55.8%, nickel 26.3%, chromium 15.1%, molybdenum 2.19%, silicon 0.39%, crbon 0.037% and manganese 0.03%. The phosphorus and sulfur were less than 0.01%, the oxygen was less than 0.01% and the nitrogen was less than 0.001%, as secured by vacuum treatment of the melt as well as by utilizing pure metalic ingredients. The alloy was cast, hot forged, the forging encapsulated in a glass capsule and homogenize annealed to 1038° C for 16 hours and then air cooled. The annealed alloy was hot and cold rolled in stages to a sheet of a thickness of 0.075 mm. The final cold rolling effected a reduction of over 20%. The final sheet was encapsulated in a high melting point glass tube, which was evacuated and the member solution annealed at 1038° C for one hour and then water quenched.

A series of various high temperature alloys, including a number of representative stainless steels, and ordinary steel for comparison purposes, were subjected to neutron and ion induced radiation. The following Table I sets forth the several alloy compositions and the total neutron and/or ion radiation dosage applied to samples of the alloys along with the reported change in volume produced by irradiation. Some of these data are from the literature. Furthermore, the computed $\bar{N}_v$ for the several alloys is also set forth.

TABLE I

COMPARISON OF SWELLING DATA
FOR NEUTRONS AND SIMULATION TECHNIQUES
NEUTRON DATA

| Material | $\phi(n/cm^2)$ | T(° F/° C) | $\frac{\Delta V}{V_o}$ | $\bar{N}_v$ |
| --- | --- | --- | --- | --- |
| Hastelloy-X | $5.4(10^{22})$ | 1115/601 | 2.1 | 1.29 |
| Inconel 600 | $4.5(10^{22})$ | 930/499 | 0.13 | 1.54 |
| Inconel 625 | $6.0(10^{22})$ | 1075/635 | 0.2 | 2.20 |
| P.E. 16 | $4.2(10^{22})$ | 930/499 | 0.3 | 2.29 |
| Incoloy 800 | $5.4(10^{22})$ | 1190/643 | 0.3 | 2.56 |
| ST316SS | $6.0(10^{22})$ | 930–1025/499–551 | 4.0 | 2.90 |
| ST304SS | $6.0(10^{22})$ | 840–930/449–499 | 6.0 | 2.94 |

SIMULATION DATA

| Material | Technique | Equivalent Dose | T(° F/° C) | $\frac{V}{V}$ % | $\bar{N}_v$ |
| --- | --- | --- | --- | --- | --- |
| Inconel | Ni Ions | $1.8(10^{23})$ | 1150/621 | 0.1 | 1.54 |
| Inconel X-750 | Ni Ions | $9.4(10^{22})$ | 1020/549 | 0 | 1.71 |
| P.E. 16 | Ni Ions | $8(10^{22})$ | 975/524 | 0.2 | 2.29 |
| A-286 | Ni Ions | $8(10^{22})$ | 1110/599 | 0 | 2.76 |
| Si-killed mild | Fe Ions | $1.1(10^{23})$ | 1025/551 | 1.3 | 2.67 |

SIMULATION DATA-continued

| Material | Technique | Equivalent Dose | T(° F/° C) | $\frac{V}{V}\%$ | $\overline{N}_\nu$ |
|---|---|---|---|---|---|
| steel | | | | | |
| Cr-M-12 Ferritic steel | Fe Ions | 1.2 (10²³) | 1025/551 | 0 | 2.79 |
| ST316SS | Ni Ions | 1.5 (10²³) | 1150/621 | 16.8 | 2.90 |
| ST304SS | Ni Ions | 1.6 (10²³) | 1150/621 | 40.0 | 2.94 |
| Heat-to-Heat Variation Test | | | | | |
| 20% CW316SS Heat "B-1" | Ni Ions | 1.5 (10²³) | 1150/621 | 15.0 | 2.88 |
| 20% CW316SS Heat "N" | Ni Ions | 1.5 (10²³) | 1150/621 | 5.0 | 2.82 |

Referring to FIGS. 1 and 2 of the drawings, the swelling data for the several alloys listed in Table I is set forth therein in graphical form, plotting the $\overline{N}_\nu$ value of each alloy on the horizontal axis. It will be observed that at $\overline{N}_\nu$ values of from 1.6 to 2.8 the swelling is extremely low.

Particular attention is directed in FIG. 1 to the 316 stainless steel members which had $\overline{N}_\nu$ values of 2.82, 2.88, and 2.90, all within normal heat to heat variations, and when subjected to ion irradiation, the swelling was 5% at $\overline{N}_\nu$ 2.82, 15% at $\overline{N}_\nu$ 2.88, and 16.8% at $\overline{N}_\nu$ of 2.90. Type 304 stainless steel with an $\overline{N}_\nu$ value of 2.94 exhibited about a 40% swelling when irradiated to 1.6 × 10²³ nvt equivalent dose. In FIG. 2 the data are test results from actual neutron irradiation of the alloys, and the swelling data are essentially consistent with the FIG. 1 data.

Referring to FIG. 3 of the drawings, there is plotted the swelling of 316 stainless steel against the equivalent nvt radiation applied thereto. Also plotted is a curve for the specific alloy in the specific Example of this invention set forth above, under a similar test. It will be noted that the swelling of the alloy of the present invention for the same cumulative irradiation is approximately a whole order of magnitude less than that of the 316 stainless steel. The swelling of the alloy of this example at a dose of, 24 dpa (3 × 10²³ equivalent nvt) is 1.6 + 1%. After this irradiation, tests on the alloy have indicated that the average void size was 185A and the void density was 5.9 × 10¹⁵ per cm³. The swelling at 15 dpa is estimated to be about 0.5%.

Referring to FIG. 4 of the drawings, there is plotted both (1) the swelling as a result of irradiation of nickel-chromium-iron base alloys containing various nickel percentages and (2) the corrosion of these alloys in molten sodium at 1325° F. Owing to the variations in content of the chromium, molybdenum, and the other components of the alloys the swelling and corrosion properties can be only depicted as a relatively broad band, but the points where the lowest values of both curves jointly occur is at the 25 to 35% nickel content. By careful study and detailed analysis of the effects of swelling and dissolution in liquid sodium, it has been determined that the 25 to 35% nickel alloy possess the optimum joint properties for reactor applications in addition to good strength, creep-rupture and other properties. Solubility of not over about 1 mil per year in molten sodium and a swelling of below 5% at 1 × 10²³ nvt provide for the best overall characteristics for LMFBR usage.

The strength properties of the alloys of the present invention, and particularly the creep rupture strength and yield strength, at elevated temperatures are at least equal to, and generally are superior to the corresponding mechanical properties of the 316 stainless steels.

The alloys of the present invention may be rolled into sheets of plates or drawn and/or rolled into tubing for use as fuel cladding. Such tubing may have a wall thickness of from 15 to 30 mils so that fuel pellets of, for example, uranium oxides and/or thorium oxides, may be placed therein and then the ends welded with caps and an inert gas is introduced thereon under a pressure of several hundred psi. The fuel elements may then be placed within supporting grids to produce fuel element assemblies. The grids for the assembly of fuel rods will be produced from members of the alloy of the present invention. One or more of the fuel assemblies will ordinarily be placed within a duct comprising a sheet metal tube of the alloy of this invention enclosing the complete fuel assembly. In operation, liquid sodium will be caused to flow through the ducts and thereby forcefully guided around and between the fuel elements held together to provide adequate spacing by the grids in the fuel assembly so that the heat generated by the nuclear fuel will be adequately absorbed and the fuel elements prevented from reaching excessive hot spot temperatures. The sodium will react with and corrode the cladding, grid assembly and ducts of the present alloy at an extremely low rate of not in excess of about 1 to 2 mils of the surface per year while at temperatures of up to 1325° F. Consequently, at the end of 3 years, approximately 3 mils, or less in some cases, of the surface will have been corroded away leaving approximately 80% to 90% of the original alloy present on the fuel cladding. Swelling will be less than 5% and ordinarily on the order of 2% or less over this period of time. Consequently, bending or bowing and distortion of the fuel elements, grids and ducts will be extremely small so that the spaces for flow of sodium will not be unduly constricted or restricted. Satisfactory and safe operation of LMFBR reactors will consequently be far easier to attain using the alloys of the present invention than any other known alloy available heretofore.

We claim as our invention:

1. A shaped alloy member suitable for use in a nuclear reactor incorporating sodium wherein the member is in contact with the molten sodium at temperatures up to about 1325° F and subject to high neutron flux, the alloy comprising said member consisting essentially of from about 14% to 19% chromium, from about 25% to 35% nickel, from about 2% to 3% molybdenum, from about 0.1% to 1% silicon, up to about 0.5% manganese, from about 0.03% to 0.05% carbon, up to about 0.01% sulphur, up to about 0.01% phosphorus, up to about 0.003% boron, up to about 0.01% oxygen, up to about 0.02% nitrogen, the balance being essentially iron with trace impurities with the $\overline{N}_\nu$ value thereof being between 1.6 and 2.8, said alloy characterized by a low corrosion rate not in excess of from about 1 to 2 mils per year for the surfaces in contact with the sodium and further characterized by a low swelling not exceeding about 5% after exposure to $3 \times 10^{23}$ nvt, said shaped alloy member having been worked equivalent to from about 20% to 30% of cold working and heat treated to solution harden it and to develop high creep rupture strength and high yield strength at the temperatures of use in the nuclear reactor.

2. A metal member suitable for use as a component in a nuclear reactor imcorporating molten sodium as a medium in contact with the component during operation of the reactor, the member comprising an alloy worked to the equivalent of from about 20% to 30% cold working and solution hardened heat treated, the alloy being characterized by good creep rupture and high yield strength physical properties at elevated temperatures of up to 1325° F, low corrosion in molten sodium, and low swelling when subjected to nuclear irradiation, the alloy consisting essentially of from about 15% to 18% of chromium, from 25% to 35% of nickel, from about 2% to 3% of molybdenum as the solution hardener, from about 0.1% to 1% of silicon from about 0.25% to 0.5% of manganese, from about 0.03 to 0.05% carbon, up to about 0.01% sulfur, up to about 0.01% phosphorus, up to 0.01% boron, up to about 0.01% oxygen, up to 0.02% nitrogen, small amounts of incidental impurities, and the balance being iron, with the $\overline{N}_v$ value being between 1.6 and 2.8.

* * * * *